United States Patent [19]

Kuriyama et al.

[11] Patent Number: 4,918,114
[45] Date of Patent: Apr. 17, 1990

[54] TELECHELIC VINYL RESIN OF LOW MOLECULAR WEIGHT HAVING ALKOXYSILYL GROUP AND PROCESS FOR PREPARATION THEREOF

[75] Inventors: Akira Kuriyama, Higashiosaka; Hiromu Okamoto, Otsu, both of Japan

[73] Assignee: Sunstar Giken Kabushiki Kaisha, Osaka, Japan

[21] Appl. No.: 283,599

[22] PCT Filed: Mar. 29, 1988

[86] PCT No.: PCT/JP88/00311
§ 371 Date: Nov. 30, 1988
§ 102(e) Date: Nov. 30, 1988

[87] PCT Pub. No.: WO88/07554
PCT Pub. Date: Oct. 6, 1988

[30] Foreign Application Priority Data

Mar. 31, 1987 [JP] Japan ................................. 62-80109

[51] Int. Cl.⁴ ............................ C08F 4/00; C08F 2/46
[52] U.S. Cl. ...................................... 522/27; 522/54; 522/182
[58] Field of Search ................. 526/194, 223; 522/27, 522/54, 182

[56] References Cited

U.S. PATENT DOCUMENTS

| | | | |
|---|---|---|---|
| 2,396,997 | 3/1946 | Fryling | 526/223 |
| 2,906,741 | 9/1959 | Hwa | 526/194 |
| 3,931,355 | 1/1976 | Rudolph et al. | 526/194 |
| 4,146,697 | 3/1979 | White | 526/194 |
| 4,543,403 | 9/1985 | Isayama et al. | 526/194 |

FOREIGN PATENT DOCUMENTS 0217178  4/1987  European Pat. Off.

*Primary Examiner*—Joseph L. Schofer
*Assistant Examiner*—N. Sarofim
*Attorney, Agent, or Firm*—Wegner & Bretschneider

[57] ABSTRACT

A process for preparing a telechelic vinyl resin of a low molecular weight having alkoxysilylalkyl thioether groups at both termini, which comprises subjecting 1 to 20 parts by weight of one or more of a disulfide compound, 0.01 to 1 part by weight of one or more of a tetrasulfide compound, and 100 parts by weight of a vinyl monomer to photopolymerization reaction, a part of the vinyl monomer being optionally substituted with a monomer having an alkoxysilyl group, and the resin prepared by said process. The resin of the present invention provides a crosslinkable resin having an excellent physical strength after curing and can be used for paints, adhesives, sealants, pressure-sensitive adhesives and the like.

3 Claims, No Drawings

TELECHELIC VINYL RESIN OF LOW MOLECULAR WEIGHT HAVING ALKOXYSILYL GROUP AND PROCESS FOR PREPARATION THEREOF

TECHNICAL FIELD

The present invention relates to telechelic vinyl resin of a low molecular weight having an alkoxysilyl group. More particularly, the present invention relates to vinyl resin of a low molecular weight which becomes a crosslinkable resin having an excellent physical strength after condensation of alkoxysilylalkyl thioether groups at both termini of the molecule and is useful as an ingredient for paints, adhesives, sealants, pressure-sensitive adhesives and the like, and further has a good workability due to its proper resin viscosity or solution viscosity when used, and a process for preparation thereof.

BACKGROUND ART

Hitherto, an introduction of reactive silyl groups into acrylic resins has been attempted from the viewpoints that silicone resins have an excellent weatherability, heat resistance and chemical resistance and that acrylic resins have an excellent weatherability and heat resistance.

The present inventors have already succeeded in preparation of telechelic vinyl resins where alkoxysilyl groups are introduced at both terminals, by subjecting disulfide compounds having a specific alkoxysilyl group and various vinyl monomers including an acrylic monomer to photopolymerization reaction, which is a pending patent application (see Japanese Patent Application No. 211667/1985 =U.S. Ser. No. 086241 now abandoned and EP-A-0217178). However, in case that the vinyl resins have too high number average molecular weight, resin viscosity or solution viscosity of the resins becomes extremely high, resulting in a decreased workability when used. Further it has problems during the preparation, i.e. when the disulfide compounds and the acrylic monomers are subjected to photopolymerization reaction, owing to exothermic reaction by rapid polymerization, the temperature inside the vessel is remarkably raised, which induces an extreme increase in a viscosity or gelation of the produced polymer. In addition, when the reaction is conducted on a large scale, the inner pressure of the reaction vessel increases by the exothermic reaction, which creates a too dangerous condition to continue the reaction.

Under such circumstances, the present inventors have studies intensively to solve the above-mentioned problems. As a result, the present inventors have found that vinyl resins of a low molecular weight having a good workability when used can be prepared by employing a specific tetrasulfide compound in addition to the disulfide compound in the above photopolymerization reaction and by specifying a ratio of the reaction components and that the photopolymerization reaction can be carried out safely even on a large amount scale by controlling the generation of heat through decrease of a polymerization rate. Thus the present invention has now been completed.

DISCLOSURE OF THE INVENTION

That is, the present invention provides a process for preparing vinyl resins of a low molecular weight having alkoxysilylalkyl thioether groups at both termini, which comprises subjecting 1 to 20 parts (parts by weight, hereinafter the same) of one or more of a disulfide compound represented by the formula:

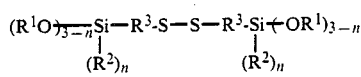

wherein $R^1$ and $R^2$ are the same or different and are each on alkyl having 1 to 4 carbon atoms, $R^3$ is an alkylene having 1 to 4 carbon atoms, and n is an integer of 0 to 2, 0.01 to 1 part of one or more of a tetrasulfide compound represented by the formula:

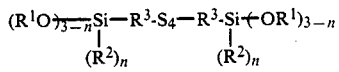

wherein $R^1$, $R^2$, $R^3$ and n are the same as defined above, and 100 parts of one or more of a vinyl monomer represented by the formula:

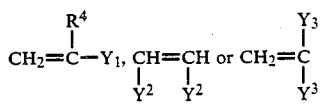

wherein $R^4$ is hydrogen atom or methyl, $Y^1$ is a carboxyalkyl (or phenylalkyl or cycloalkyl) ester group, phenyl or a halogen atom, $Y^2$ is a carboxyalkyl ester group having 2 to 6 carbon atoms or a halogen atom and $Y^3$ is fluorine atom or chlorine atom to photopolymerization reaction, and also provides the vinyl resins of a low molecular weight prepared by the above process.

The above disulfide compounds employed in the present invention include, for example:
bis(trimethoxy-(or triethoxy-)silylmethyl)disulfide,
bis(trimethoxy-(or triethoxy-)silylethyl)disulfide,
bis(trimethoxy-(or triethoxy-(silylpropyl)disulfide,
bis(trimethoxy-(or triethoxy-)silylbutyl)disulfide
bis(methyl-dimethoxy-(or diethoxy-)silylmethyl)disulfide,
bis(methyl-dimethoxy-(or diethoxy-)silylethyl)disulfide,
bis(methyl-dimethoxy-(or diethoxy-)silylpropyl)disulfide,
bis(methyl-dimethoxy-(or diethoxy-)silylbutyl)disulfide,
bis(ethyl-dimethoxy-(or diethoxy-)silylmethyl)disulfide,
bis(ethyl-dimethoxy-(or diethoxy-)silylethyl)disulfide,
bis(ethyl-dimethoxy-(or diethoxy-)silylpropyl)disulfide,
bis(ethyl-dimethoxy-(or diethoxy-)silylbutyl)disulfide,
bis(propyl-dimethoxy-(or diethoxy-)silylmethyl)disulfide,
bis(propyl-dimethoxy-(or diethoxy-)silylethyl)disulfide,
bis(propyl-dimethoxy-(or diethoxy-)silylpropyl)disulfide,
bis(propyl-dimethoxy-(or diethoxy-)silylbutyl)disulfide,
bis(dimethyl-methoxy-(or ethoxy-)silylmethyl)disulfide,
bis(dimethyl-methoxy-(or ethoxy-)silylethyldisulfide,
bis(dimethyl-methoxy-(or ethoxy-)silylpropyl)disulfide,
bis(dimethyl-methoxy-(or ethoxy-)silylbutyl)disulfide,
bis(diethyl-methoxy-(or ethoxy)silylmethyl)disulfide,
bis(diethyl-methoxy-(or ethoxy)silylethyl)disulfide,
bis(diethyl-methoxy-(or ethoxy)silylpropyl)disulfide,
bis(diethyl-methoxy-(or ethoxy)silylbutyl)disulfide,
bis(dipropyl-methoxy-(or ethoxy-)silylmethyl)disulfide,
bis(dipropyl-methoxy-(or ethoxy-)silylethyl)disulfide, bis(dipropyl-methoxy-(or ethoxy-)silylpropyl)disulfide, and
bis(dipropyl-methoxy-(or ethoxy-)silylbutyl)disulfide.

One or more of the above disulfide compounds are subjected to the polymerization reaction.

The above tetrasulfide compounds employed in the present invention include, for example, bis(trimethoxysilylpropyl)tetrasulfide of the formula:

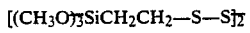
[(CH$_3$O)$_3$SiCH$_2$CH$_2$—S—S]$_2$ bis(methyldimethoxysilylpropyl)tetrasulfide of the formula:

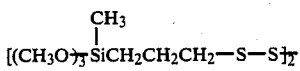
$$\begin{array}{c}CH_3\\|\\ [(CH_3O)_2SiCH_2CH_2CH_2-S-S]_2\end{array}$$

bis(triethoxysilylpropyl)tetrasulfide of the formula:

[(C$_2$H$_5$O)$_3$SiCH$_2$CH$_2$CH$_2$—S—S]$_2$ bis(methoxydiethoxysilylpropyl)tetrasulfide of the formula:

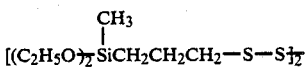
$$\begin{array}{c}CH_3\\|\\ [(C_2H_5O)_2SiCH_2CH_2CH_2-S-S]_2\end{array}$$

and the like.

One or more of the above tetrasulfide compounds are subjected to the polymerization reaction.

The above vinyl monomer employed in the present invention includes, for example, $C_1$-$C_{17}$ alkyl esters of acrylic acid (ethyl acrylate, butyl acrylate, 2-ethylhexyl acrylate, propyl acrylate, pentyl acrylate, stearyl acrylate, etc.), $C_1$-$C_{17}$ alkyl esters, phenyl($C_1$-$C_2$)alkyl esters of $C_5$-$C_7$ cycloalkyl esters of methacrylic acid (methyl methacrylate, ethyl methacrylate, butyl methacrylate, 2-ethylhexyl methacrylate, lauryl methacrylate, benzyl methacrylate, cyclohexyl methacrylate, etc.), styrene or derivatives thereof ($\alpha$-methylstyrene, chloromethyl styrene, etc.), di($C_1$-$C_4$ alkyl) esters of fumaric acid (diethyl fumarate, dibutyl fumarate, dipropyl fumarate, etc.), vinyl halides (vinyl chloride, vinylidene chloride, ethylene fluoride, vinylidene fluoride, vinylene fluoride, etc.), vinyl acetate and the like. One or more of the monomers are subjected to the polymerization reaction.

With respect to a ratio of these reaction components, 1-20 parts, preferably 5-10 parts, of the disulfide compound and 0.01-1 parts, preferably 0.01 to 0.5 parts, of the tetrasulfide compound are employed based on 100 parts of the vinyl monomer. When less than 1 part of the disulfide compound is employed, the molecular weight increases extremely and the viscosity of the produced polymerization mixture becomes so high that workability decreases. When more than 20 parts of the disulfide compound are employed, no additional effect is obtained but rather unreacted disulfide compounds increase and it is economically disadvantageous. When less than 0.01 parts of the tetrasulfide compound is employed, it results in decrease of the molecular weight of the product and in uncontrollable reaction temperature. When more than 1 part of the tetrasulfide compound is employed, the polymerization reaction is remarkably inhibited which causes decrease of polymerization yield.

The vinyl resin having a low molecular weight according to the present invention can be prepared by subjecting the three reaction components at the above fixed ratio to the photopolymerization reaction in conventional manner, for example, by conducting light irradiation optionally in a suitable organic solvent (toluene, xylene, hexane, ethyl acetate, dioctyl phthalate, etc.) at room temperature or at a temperature of from 5 to 60° C. for 4 to 30 hours.

If it is desired to increase a resin strength of the vinyl resin after curing, 0.1-10 parts among 100 parts of the above vinyl monomer are replaced with monomers having an alkoxysilyl group so that additional alkoxysilyl groups are introduced into the polymer side chain to increase a crosslinking density after curing. Such monomers include, for example, trimethoxysilylpropyl acrylate, trimethoxysilylpropyl methacrylate, methyldimethoxysilylpropyl acrylate, methyldimethoxysilylpropyl methacrylate, vinyltriethoxysilane, vinyldimethylethoxysilane, and the like. When water is present in the polymerization system even in a very small amount, there can not be employed a monomer having an acidic group such as a carboxylic acid group, phosphoric acid group or sulfonic acid group. If these are employed in the presence of water, the system is gelated as a whole during the polymerization reaction.

The vinyl prepared as mentioned above of the present invention has a alkoxysilylalkyl thioether group at both termini of the molecule, and hence becomes a crosslinkable resin having an excellent physical strength after condensation of said group and is useful as an ingredient for paints, adhesives, sealants, pressure-sensitive adhesives and the like. An appropriate resin viscosity or solution viscosity is obtainable by specifically adjusting the number average molecular weight at 2000-50000, which results in an improved workability when used. For example, when the resin is used in paints, high-solid paints can be produced.

Best Mode for Practicing the Invention

The present invention is more specifically explained by the following Examples.

EXAMPLE 1

A glass-made sealing tube is charged with 20 g of butyl acrylate, 1 g of bis(methyldimethoxysilylpropyl)disulfide and 0.2 g of bis(triethoxysilylpropyl)tetrasulfide and melt-sealed after displacement with nitrogen and degassing. UV is irradiated to this polymerization tube at a distance of 7 cm with SHL 100 UV lamp (manufactured by Toshiba Denki K.K.) to carry out photopolymerization for 10 hours. The polymerization mixture is taken out, dried at 110° C. for 4 hours under reduced pressure. Based on the decrease of the weight, the degree of polymerization was measured. As a result, it was 62.8%. Further, a molecular weight was measured by a gel permeation chromatography (GPC) which showed a number average molecular weight ($\overline{Mn}$) of 9800.

EXAMPLES 2 TO 5 AND COMPARATIVE EXAMPLES 1 AND 2

The photopolymerization is carried out in the same manner as described in Example 1 employing the reaction components as shown in the following Table 1. The molecular weights of the obtained polymers are also shown in Table 1.

TABLE 1

| | | Example | | | | | Comp. Example | |
|---|---|---|---|---|---|---|---|---|
| | | 1 | 2 | 3 | 4 | 5 | 1 | 2 |
| Monomer (g) | BA | 20 | — | 20 | 80 | — | 20 | — |
| | EA | — | 20 | — | — | 50 | — | 50 |
| | αMeSt | — | — | 0.1 | — | — | — | — |
| | VAC | — | — | — | 20 | — | — | — |
| | 2EHA | — | — | — | — | 50 | — | 50 |
| Disulfide (g) | DMDS | 1 | 2 | — | — | 5 | 1 | 10 |
| | TMDS | — | — | 1 | 10 | — | — | — |
| Tetrasulfide (g) | TETS | 0.2 | 0.2 | — | — | 1 | — | — |
| | TMTS | — | — | 0.1 | 0.5 | — | — | — |
| $Mn \times 10^4$ | | 0.98 | 2.2 | 1.4 | 0.87 | 0.92 | 12.4 | 11.5 |

(Note) In the above Table 1, each abbreviation shows the following general names.
BA: Butyl acrylate
EA: Ethyl acrylate
αMeSt: α-Methylstyrene
VAC: Vinyl acetate
2EHA: 2-Ethylhexyl acrylate
DMDS: Bis(methyldimethoxysilylpropyl)di-sulfide
TMDS: Bis(trimethoxysilylpropyl)disulfide
TETS: Bis(triethoxysilylpropyl)tetrasulfide
TMTS: Bis(trimethoxysilylpropyl)tetrasulfide

I claim:

1. A process for preparing vinyl resin of a low molecular weight having alkoxysilylalkyl thioether groups at both termini, which comprises subjecting (a) 1 to 20 parts by weight of one or more of a disulfide compound represented by the formula:

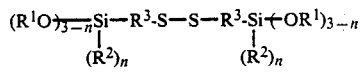

wherein $R^1$ and $R^2$ are the same or different and are each an alkyl having 1 to 4 carbon atoms, $R^3$ is an alkylene having 1 to 4 carbon atoms, and n is an integer of 0 to 2, (b) 0.01 to 1 part by weight of one or more of a tetrasulfide compound represented by the formula:

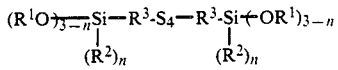

wherein $R^1$, $R^2$, $R^3$ and n are the same as defined above, and (c) 100 parts by weight of one or more of a vinyl monomer represented by the formula:

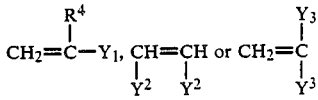

wherein $R^4$ is hydrogen atom or methyl, $Y^1$ is a carboxyalkyl (or phenylalkyl or cycloalkyl) ester group, phenyl or a halogen atom, $Y^2$ is a carboxyalkyl ester group having 2 to 6 carbon atoms or a halogen atom and $Y^3$ is fluorine atom or chlorine atom to photopolymerization reaction.

2. The process according to claim 1 wherein, among 100 parts by weight of the vinyl monomer, 0.1 to 10 parts by weight of the monomer is substituted with a monomer having an alkoxysilyl group.

3. The process according to claim 1 wherein 5 to 10 parts by weight of the disulfide compound and 0.01 to 0.5 parts by weight of the tetrasulfide compound are employed based on 100 parts by weight of the vinyl monomer.

* * * * *